(12) United States Patent
Chen et al.

(10) Patent No.: US 11,360,338 B2
(45) Date of Patent: Jun. 14, 2022

(54) ELECTRONIC DEVICE WITH A CONDUCTIVE ADHESIVE FOR BONDING A PANEL AND A FRAME

(71) Applicant: InnoLux Corporation, Miao-Li County (TW)

(72) Inventors: Chien-Nian Chen, Miao-Li County (TW); Yu-Chun Huang, Miao-Li County (TW); I-Han Liu, Miao-Li County (TW); Ming-Tien Wang, Miao-Li County (TW); Yung-Yu Tsai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/943,449

(22) Filed: Jul. 30, 2020

(65) Prior Publication Data
US 2021/0055599 A1 Feb. 25, 2021

(30) Foreign Application Priority Data
Aug. 21, 2019 (CN) .......................... 201910772714.7

(51) Int. Cl.
*G02F 1/1333* (2006.01)
*G02F 1/1335* (2006.01)
*G02F 1/13357* (2006.01)

(52) U.S. Cl.
CPC .. *G02F 1/133308* (2013.01); *G02F 1/133317* (2021.01); *G02F 1/133328* (2021.01); *G02F 1/133528* (2013.01); *G02F 1/133608* (2013.01); *G02F 1/133314* (2021.01); *G02F 2202/22* (2013.01); *G02F 2202/28* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0223249 A1* | 12/2003 | Lee | .................... | G02F 1/133608 362/561 |
| 2008/0111943 A1* | 5/2008 | Kim | .................. | G02F 1/133608 349/60 |
| 2013/0107127 A1* | 5/2013 | Yokawa | ................. | H04N 5/655 348/725 |

FOREIGN PATENT DOCUMENTS

| | | | | |
|---|---|---|---|---|
| CN | 10-4388003 | * | 3/2015 | ............... C09J 7/02 |
| CN | 104388003 A | | 3/2015 | |
| CN | 204922672 U | | 12/2015 | |

* cited by examiner

*Primary Examiner* — Lauren Nguyen
(74) *Attorney, Agent, or Firm* — McClure, Qualey & Rodack, LLP

(57) ABSTRACT

A display device is provided. The display device includes: a frame, a panel, and a conductive adhesive. The panel is bonded to the frame via the conductive adhesive. The panel further includes a back plate and a conductive component, wherein the conductive adhesive is electrically connected to the back plate via the conductive component.

16 Claims, 8 Drawing Sheets

ELECTRONIC DEVICE WITH A CONDUCTIVE ADHESIVE FOR BONDING A PANEL AND A FRAME

CROSS REFERENCE TO RELATED APPLICATIONS

This application claims priority of China Patent Application No. 201910772714.7, filed Aug. 21, 2019, the entirety of which is incorporated by reference herein.

BACKGROUND

Field of the Disclosure

The present disclosure relates to an electronic device, and in particular to an electronic device having a conductive adhesive for bonding a panel and a frame.

Description of the Related Art

To date, borderless design has gradually become a mainstay of display devices. Due to cost considerations and appearance requirements, the middle frame of the display device is mostly made of plastic material. However, plastic is an insulating material, so that the display device does not form a conductive path. When performing electrostatic discharge (ESD) testing on the display device, external static electricity cannot be grounded successfully, and often results in a failure to pass the test. At present, in order to solve the above-mentioned problem, it is necessary to manually add other conductive components to the display device, resulting in a more complicated assembly process and increased manufacturing costs.

BRIEF SUMMARY

Some embodiments of the disclosure provide an electronic device, including: a frame, a panel, and a conductive adhesive. The panel is bonded to the frame via the conductive adhesive.

For making the above or other purposes, features and advantages of the present disclosure more clear, some embodiments are provided in the following paragraphs, and subsequent detailed description is provided as follows with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

The display devices of some embodiments of the present disclosure are described in the following description. The specific embodiments disclosed are provided merely to clearly describe the usage of the present disclosure by some specific methods without limiting the scope of the present disclosure.

In addition, in this specification, relative expressions may be used. For example, "lower", "bottom", "higher" or "top" are used to describe the position of one element relative to another. It should be noted that if a device is flipped upside down, an element that is "lower" will become an element that is "higher."

It should be understood that, although the terms "first", "second," etc. may be used herein to describe various elements, regions, layers and/or portions, and these elements, regions, layers, and/or portions should not be limited by these terms. These terms are only used to distinguish one element, component, region, layer, or portion. Thus, a first element, component, region, layer or portion discussed below could be termed a second element, component, region, layer or portion without departing from the teachings of some embodiments of the present disclosure.

It will be understood that when an element or layer is referred to as being "disposed/located on" or "connected to" another element or layer, it can be directly on or directly connected to the other element or layer, or intervening elements or layers may be presented (indirectly). In contrast, when an element is referred to as being "directly on" or "directly connected to" another element or layer, there are no intervening elements or layers presented.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Figure 1:
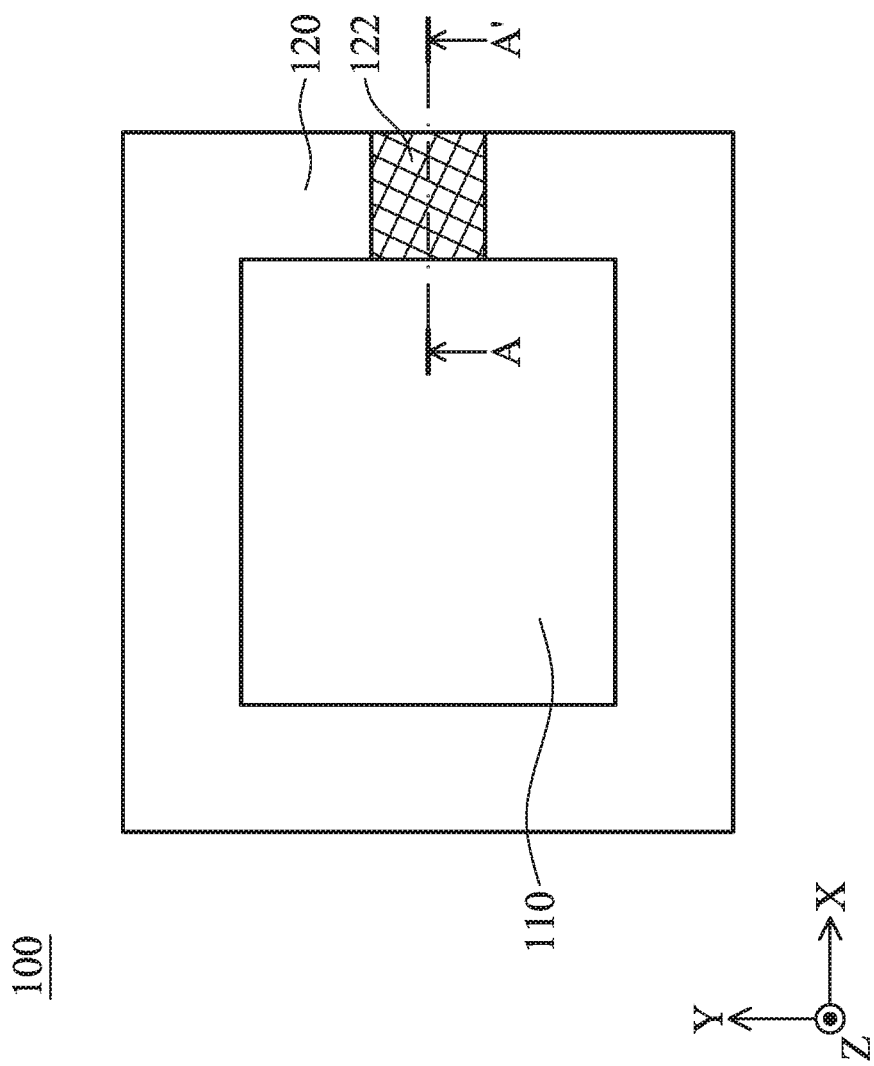
FIG. 1 is a top view illustrating an electronic device in accordance with some embodiments of the present disclosure.

FIG. 1 is a cross-sectional view illustrating a display device 100 in accordance with some embodiments of the present disclosure. It should be noted that the display device 100 may be applied to an electronic device, which includes a display device, an antenna device, a sensing device or a tiled device, but is not limited thereto. The electronic device may be a bendable or flexible electronic device. The electronic device may include, for example, a liquid-crystal, light-emitting diode, and the light-emitting diode may include, for example, an organic light-emitting diode (OLED), a mini LED, a micro LED or quantum dot (QD) light-emitting diode (which may be referred to as QLED, QDLED), fluorescence, phosphor, or other suitable materials, and the materials can be arranged and combined arbitrarily, but the present disclosure is not limited thereto. The antenna device may be a liquid-crystal antenna, but it is not limited thereto. The tiled device may be a display tiled device or an antenna tiled device, but it is not limited thereto. It should be noted that the electronic device may be any combination thereof, but it is not limited thereto. The present disclosure is described in a manner that the display device 100 serves as an electronic device or a tiled device as follows, but the present disclosure is not limited thereto.

As shown in FIG. 1, the display device 100 includes a panel 110, a frame 120 and a conductive component 122, wherein the panel 110 is disposed in and adhered to the frame 120, and is supported by the frame 120. In addition, the display device 100 has a normal direction, wherein the normal direction is substantially parallel to the Z axis. In the present embodiment, the conductive component 122 is disposed on one side of the display device, but it is not limited thereto. The detailed description regarding the conductive component 122 is provided as follows in accompany with FIG. 2.

Figure 2:
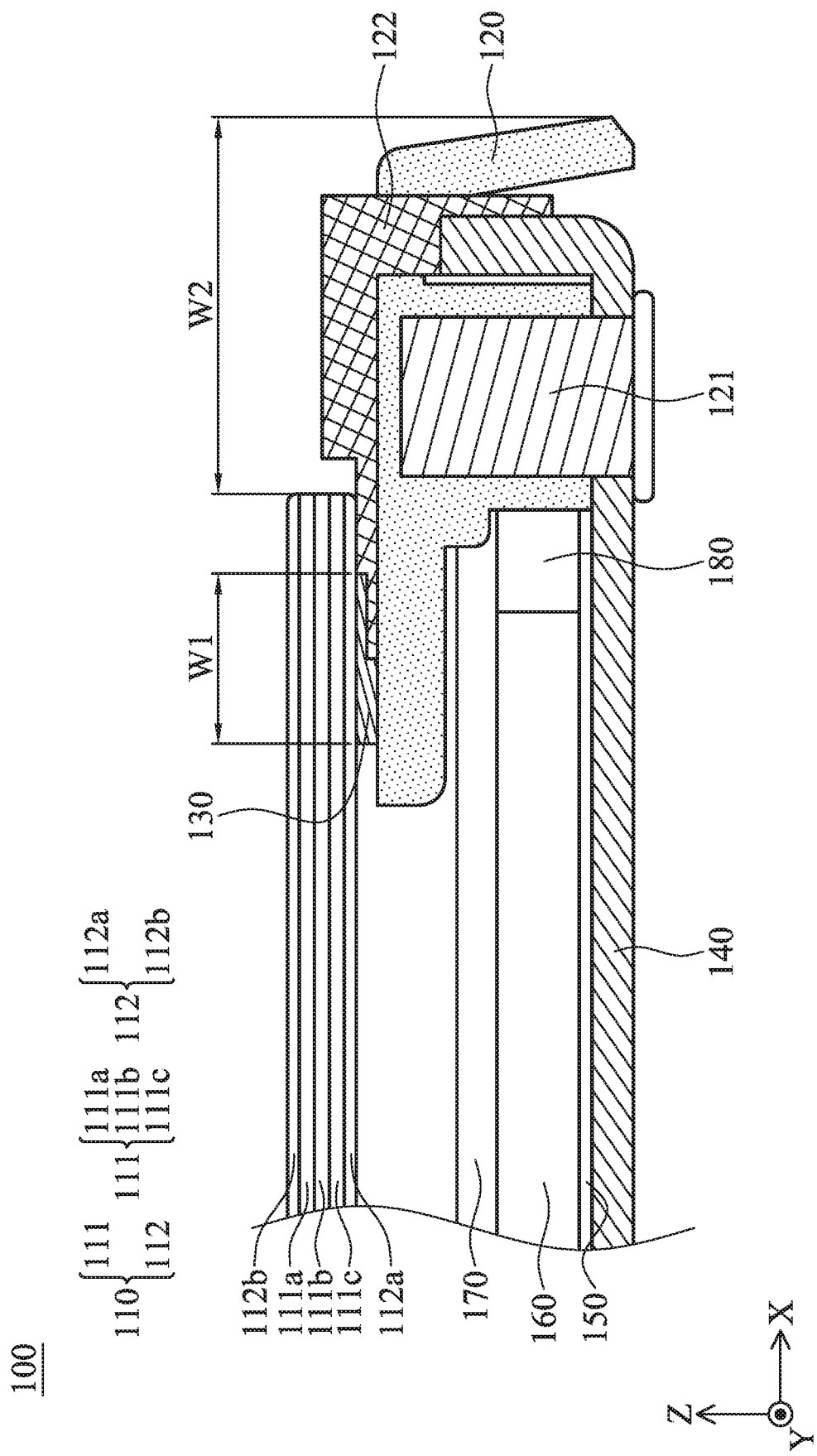
FIG. 2 is a cross-sectional view illustrating along the line A-A shown in FIG. 1.

FIG. 2 is a cross-sectional view illustrating along the line A-A shown in FIG. 1. In the present embodiment, the panel 110 includes a display structure layer 111 and a polarizing film 112 (including 112a and 112b), wherein the polarizing film 112a and the polarizing film 112b may be located on the upper and lower sides of the display structure layer 111. That is, the display structure layer 111 is located between the polarizing film 112a and the polarizing film 112b. In the present embodiment, the polarizing film 112a may be disposed on the frame 120, and the display structure layer 111 is disposed on the polarizing film 112a. The display structure layer 111 includes an upper substrate 111a, a liquid crystal layer 111b, and a lower substrate 111c that are sequentially stacked. The lower substrate 111c is disposed on the polarizing film 112a, the liquid crystal layer 111b is disposed on the lower substrate 111c, and the upper substrate 111a is disposed on the liquid crystal layer 111b. For example, the upper substrate 111a and/or the lower substrate 111c may be flexible substrates or non-flexible substrates. The materials of the upper substrate 111a and the lower substrate 111c may include glass, sapphire, ceramics, plastics, or other suitable materials. The plastic material may be, for example, polyimine (PI), polyethylene terephthalate (PET), polycarbonate (PC), polyether oxime (PES), polybutylene terephthalate (PBT), polynaphthalene ethylene glycolate (PEN), polyarylate (PAR), other suitable materials, or a combination thereof, but it is not limited thereto. In some embodiments, the liquid crystal layer 111b may include nematic liquid crystal, smectic liquid crystal, cholesteric liquid crystal, blue phase liquid crystal, or any other suitable liquid crystal material. It should be understood that, although two polarizing films 112a and 112b are respectively shown on the upper and lower sides of the display structure layer 111 in the present embodiment, those skilled in the art should be able to adjust the number and the location of the polarizing film 112 as required.

As shown in FIG. 2, the display device 100 further includes a conductive adhesive 130, a back plate 140, a reflective sheet 150, a light guide plate 160, an optical film 170, and a buffer element 180. The panel 110 is adhered to the frame 120 via the conductive adhesive 130. It should be noted that the conductive adhesive material 130 is disposed on the surface of the frame 120 facing the panel 110, and the aforementioned surface is substantially parallel to the X-Y plane (i.e. substantially perpendicular to the Z axis). In the present embodiment, the conductive adhesive 130 is adhered to the polarizing film 112a of the panel 110. In other embodiments, the conductive adhesive 130 may be adhered to the display structure layer 111 of the panel 110.

Still referring to FIG. 2, the back plate 140 is disposed below and supports the frame 120. For example, the material of the back plate 140 may include metal, any other suitable material, or a combination thereof, but it is not limited thereto. The display device 100 may optionally further include a fixing member 121 passing through the back plate 140 to affix the back plate 140 to the frame 120. In some embodiments, the fixing member 121 may include screws and other fixing members, but it is not limited thereto. The display device 100 further includes a conductive component 122 disposed on the frame 120 and electrically connected to the conductive adhesive 130 and the back plate 140. In an embodiment, the conductive component 122 directly contacts the conductive adhesive 130 and the back plate 140. A conductive path can be formed through the conductive adhesive 130, the conductive component 122, and the back plate 140, and thereby effectively grounding external static electricity through the aforementioned conductive path. As such, the display device 100 may pass an electrostatic discharge (ESD) test. In addition, in some embodiments, a plurality of conductive components 122 may be disposed in the display device 100 and electrically connected to the conductive adhesive 130 and the back plate 140. The arrangement of the conductive components 122 may effectively shorten the average conductive path, such that a better grounding effect may be obtained.

In some embodiments, the material of the conductive component 122 may include copper, silver, aluminum, other suitable conductive materials, or a combination thereof, but it is not limited thereto. In addition, since the conductive adhesive 130 and the conductive component 122 are both disposed on the surface, which faces the panel 110, of the frame 120, the conductive component 122 and the conductive adhesive 130 at least partially overlap when viewed in the Z-axis direction (i.e. the normal direction). In some embodiments, an insulating tape (not shown) or any other insulating material may be attached onto an external side (i.e. the side opposite to the side facing the frame 120) of the conductive component 122 for aesthetic and/or insulating effects.

The conductive adhesive 130 may have a first width W1 in the horizontal direction (for example, along the X axis shown in FIG. 2), and on the same side, a second width W2 may be formed from the edge of the panel 110 to the edge of the frame 120 in the horizontal direction. The second width W2 may be the minimum width from the edge of the panel 110 to the edge of the frame 120. In the present embodiment, the first width W1 may be in a range from about 1 mm to about 5 mm (that is, 1 mm≤the first width W1≤5 mm), and the second width W2 may be in a range from about 5 mm to about 9 mm (that is, 5 mm≤the second width W2≤9 mm), but they are not limited thereto. It should be understood that the above size ranges merely serve as an example for understanding the content of the present disclosure more clearly, and do not represent that there is a specific relationship between the first width W1 and the second width W2. Those skilled in the art may adjust the above sizes as required.

In addition, the reflective sheet 150 is disposed on the back plate 140, the light guide plate 160 is disposed on the reflective sheet 150, and the optical film 170 is disposed on the light guide plate 160. The buffer element 180 is disposed between the frame 120 and the reflective sheet 150, the light guide plate 160, and/or the optical film 170 for absorbing impact force and protecting components in the display device 100. For example, the material of the buffer element 180 may include rubber, any other suitable elastic material, or a combination thereof, but it is not limited thereto.

Figure 3:
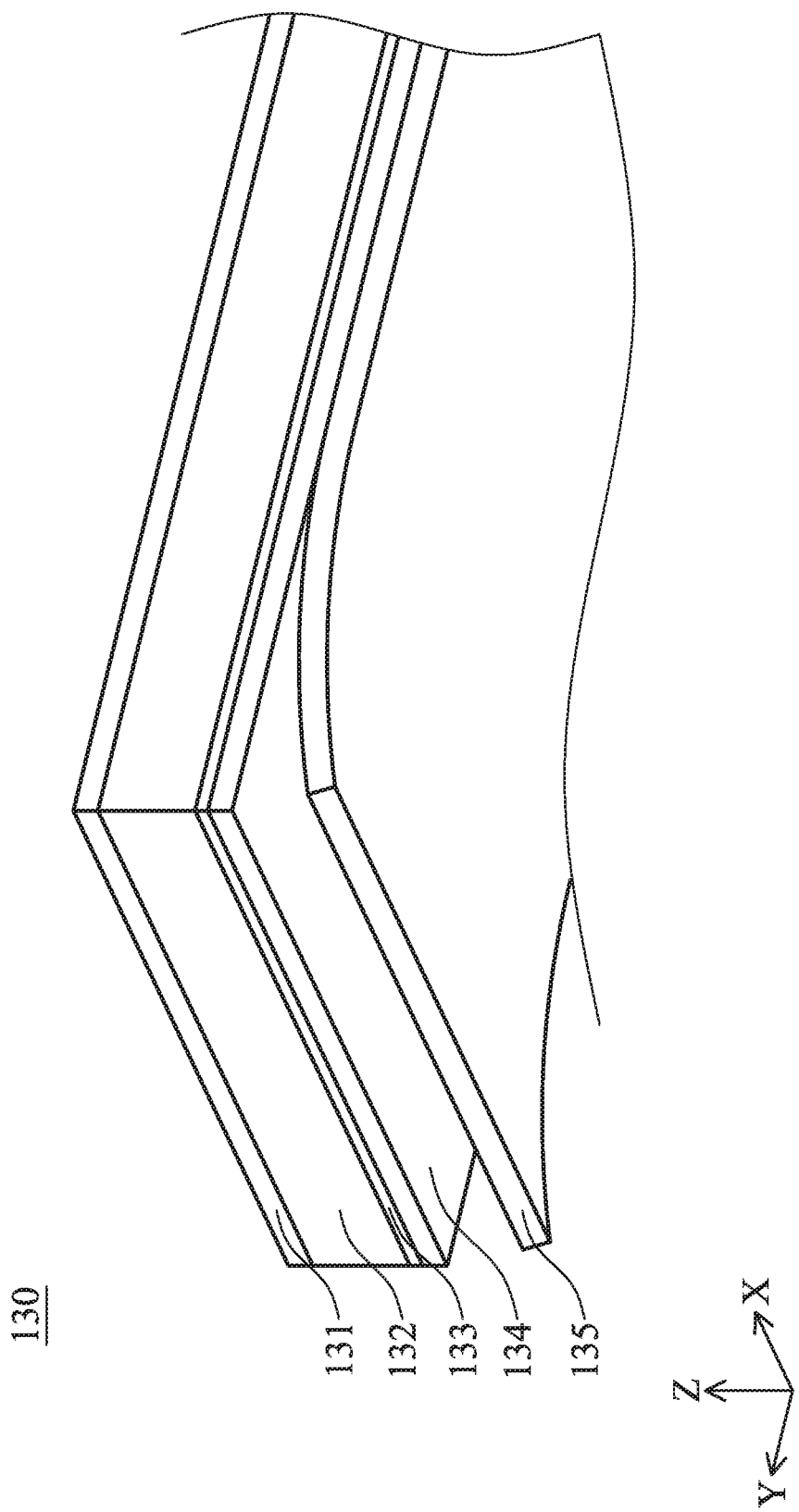
FIG. 3 is a stereogram illustrating the conductive adhesive shown in FIG. 1.

FIG. 3 is a stereogram illustrating the conductive adhesive 130 shown in FIG. 1. In the present embodiment, the conductive adhesive 130 includes a first adhesive layer 131, a foam layer 132, a conductive layer 133, a second adhesive layer 134, and a release paper layer 135 that are sequentially stacked along the Z axis (i.e. along the normal direction). It should be noted that the release paper layer 135 shown in the present embodiment is used to isolate an adhesive portion of the conductive adhesive 130 before using the conductive adhesive 130, so as to avoid foreign objects and the conductive adhesive 130 or the conductive adhesive 130 itself sticking. In other words, when the conductive adhesive 130 is adhered between the frame 120 and the panel 110, the release paper layer 135 has been removed, so it will not be located in the display device 100.

In the present embodiment, the conductive layer 133 is closer to the frame 120 than the foam layer 132. In other words, the first adhesive layer 131 is configured to be adhered to the panel 110, and the second adhesive layer 134 is configured to be adhered to the frame 120. In addition, in some embodiments, the material of the first adhesive layer 131 may include an acrylic adhesive, and the material of the second adhesive layer 134 may include an electrically conductive adhesive material, but they are not limited thereto. In other embodiments, both the first adhesive layer 131 and the second adhesive layer 134 are conductive. In addition, for example, the material of the conductive layer 133 may include aluminum polyester film (Mylar Al), copper polyester film (Mylar Cu), metal-coated polyimide (PI), any other suitable conductive materials or a combination thereof, but it is not limited thereto.

Figure 4:
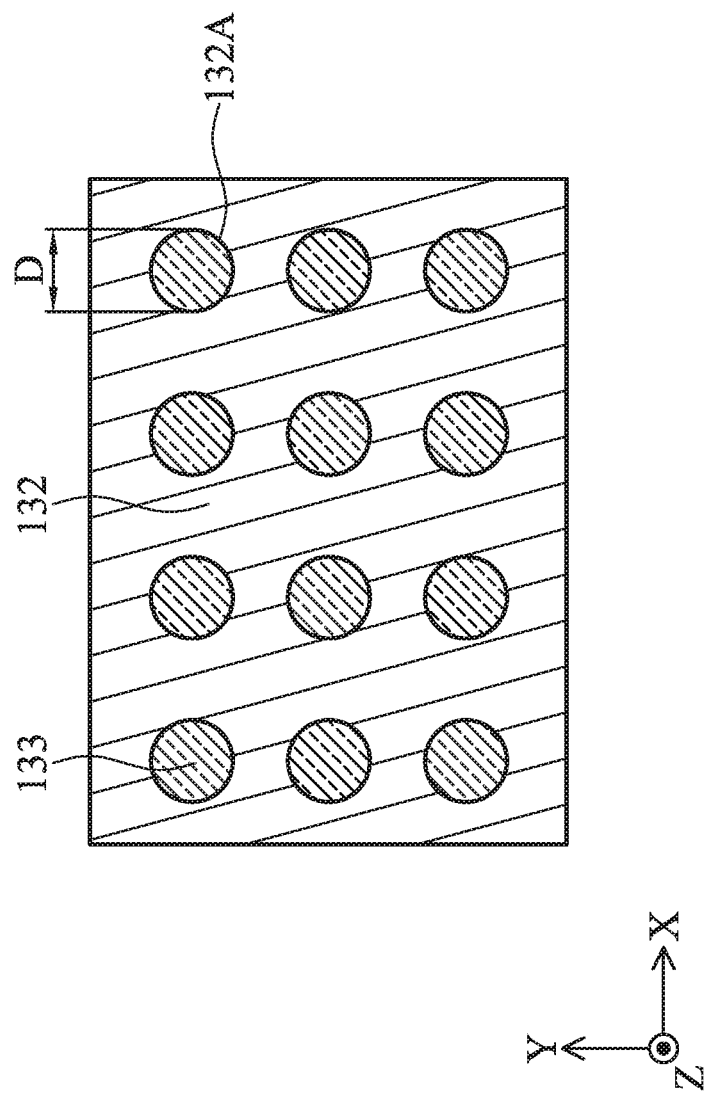
FIG. 4 is a top view illustrating the foam layer shown in FIG. 3.

FIG. 4 is a top view illustrating the foam layer 132 shown in FIG. 3. In the present embodiment, the conductive layer 133 serves as a foam carrier to perform foaming, and the foam layer 132 is formed directly on the conductive layer 133. By physical and/or chemical cross-linking reactions, the molecules are transformed into a three-dimensional grid structure. The physical cross-linking reaction refers to physical foaming, for example, an inert gas may be dissolved in plastic and then the gas is released under reduced pressure to form pore walls, but it is not limited thereto. The chemical cross-linking reaction refers to chemical foaming, such as adding a chemical foaming agent at a high temperature to cause a chemical reaction between molecules to release gas for forming pore walls, but it is not limited thereto. Therefore, the foam layer 132 is formed with a plurality of anchor pore walls 132A. The anchor pore walls 132A are fixedly connected to the conductive layer 133, and each of the anchor pore walls 132A forms an opening. Even if the foam layer 132 is removed with a solvent, a portion of the foam layer 132 and the anchor pore walls 132A remain on the conductive layer 133, and the openings formed by the anchor pore walls 132A partially expose the conductive layer 133. The openings formed by the anchor pore walls 132A have a maximum width D in the horizontal direction (the X-Y plane), and the maximum width D is in a range from about 0.05 mm to about 0.2 mm (that is, 0.05 mm≤the maximum width D≤0.2 mm). It should be noted that FIG. 4 schematically shows the anchor pore walls 132A and the openings formed thereof. Those skilled in the art should understand that the openings formed by the anchor pore walls 132A may be randomly distributed, arranged, and may have various maximum widths D and shapes.

Figure 5:
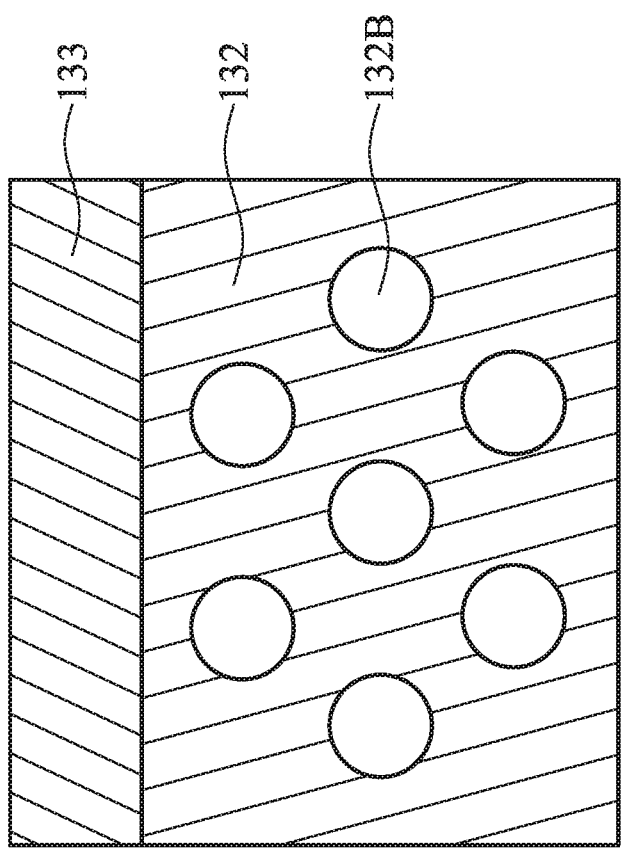
FIG. 5 is a cross-sectional view illustrating the conductive layer and the foam layer shown in FIG. 3.

FIG. 5 is a cross-sectional view illustrating the conductive layer 133 and the foam layer 132 shown in FIG. 3. As shown in FIG. 5, the conductive layer 133 and the foam layer 132 are integrally formed. The term "integrally formed" described in the present disclosure means that after a surface treatment, the conductive layer 133 may serve as the carrier material of the foam layer 132. For example, the surface treatment may be corona treatment, but it is not limited thereto. That is, there is no need to provide an additional adhesive layer to adhere the conductive layer 133 and the foam layer 132. Compared with the traditional design that requires an additional adhesive to adhere the conductive layer 133 and the foam layer 132, the integrally formed structure described in the present embodiment may significantly improve the structural strength of the conductive adhesive 130. The foam layer 132 may have a plurality of holes 132B in various directions. Similarly, those skilled in the art should understand that the holes 132B of the foam layer 132 may be randomly distributed and arranged, and may be formed in various shapes and/or sizes as required.

Figure 6:
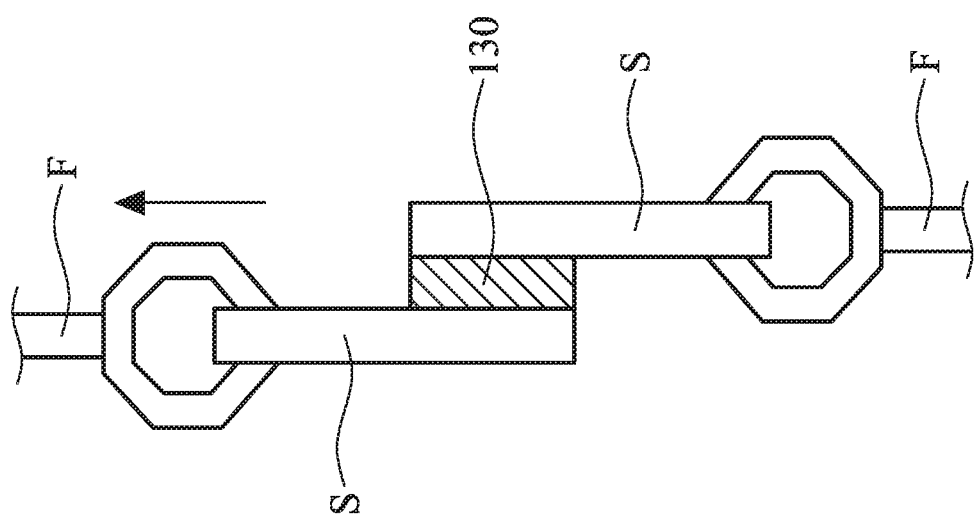
FIG. 6 is a schematic view illustrating a testing performed to the conductive adhesive in accordance with some embodiments of the present disclosure.
Figure 6:
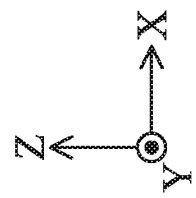

FIG. 6 is a schematic view illustrating a standard testing method ASTM D-1002 for testing the dynamic overlap shear strength of the conductive adhesive 130 in accordance with some embodiments of the present disclosure. In the present embodiment, the width of the conductive adhesive 130 in the Z direction is about 6.2 mm, and the length of the conductive adhesive 130 in the Y direction is about 25.4 mm. As shown in FIG. 6, the two sides of the conductive adhesive material 130 are respectively adhered to one end of two different steel plates S, wherein the steel plates S are arranged substantially parallel to each other. For example, the steel plate S may be an SUS304 stainless steel plate, but it is not limited thereto. In the present embodiment, after adhered to the steel plates S, the conductive adhesive 130 is placed in a 60☐ oven and baked for 1 hour. Next, the other end of the steel plates S where the conductive adhesive 130 is not adhered is affixed by a fixture F. After the fixtures F affix the steel plates S, one of the fixtures F is stretched upward at a speed of 13 mm/min (as indicated by the arrow in FIG. 6). As such, the force required to break the conductive adhesive 130 may be measured. In the present embodiment, the conductive adhesive 130 may withstand a force greater than 2.8 kgw (it may withstand a force>2.8 kgw) without being damaged.

Figure 7:
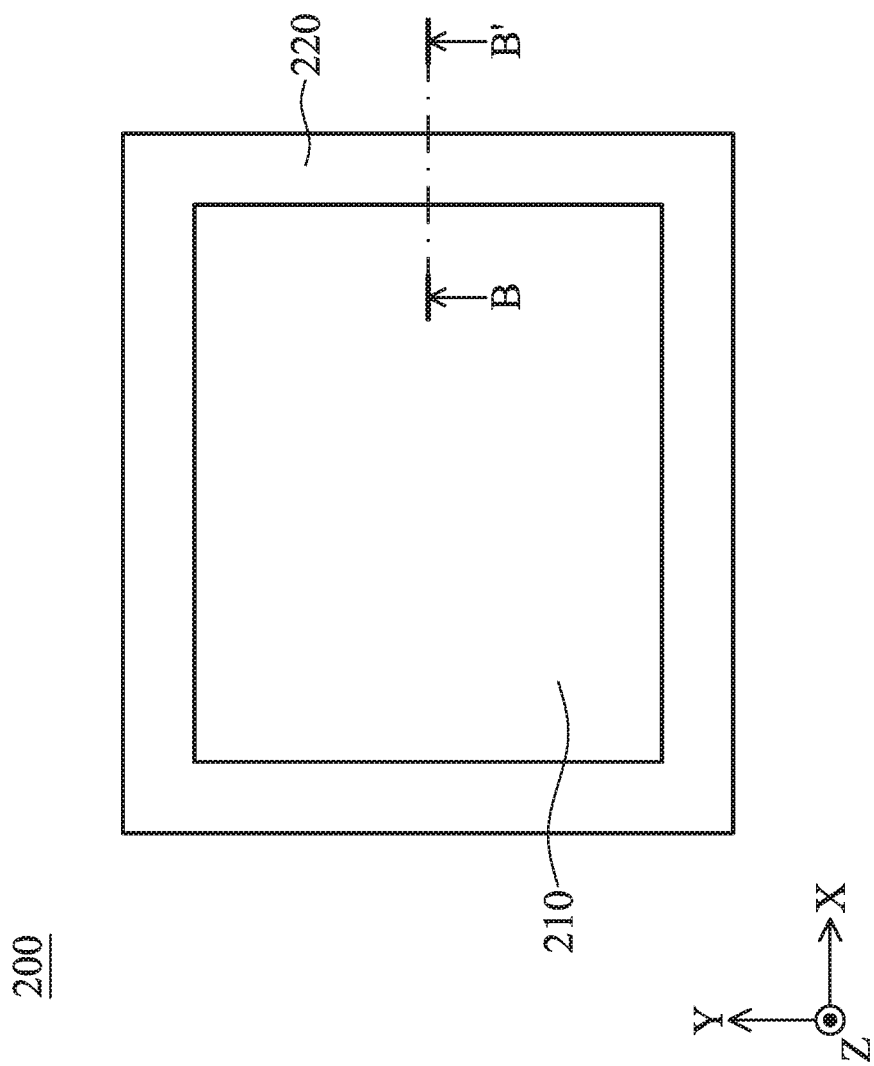
FIG. 7 is a top view illustrating the electronic device in accordance with some other embodiments of the present disclosure.
Figure 8:
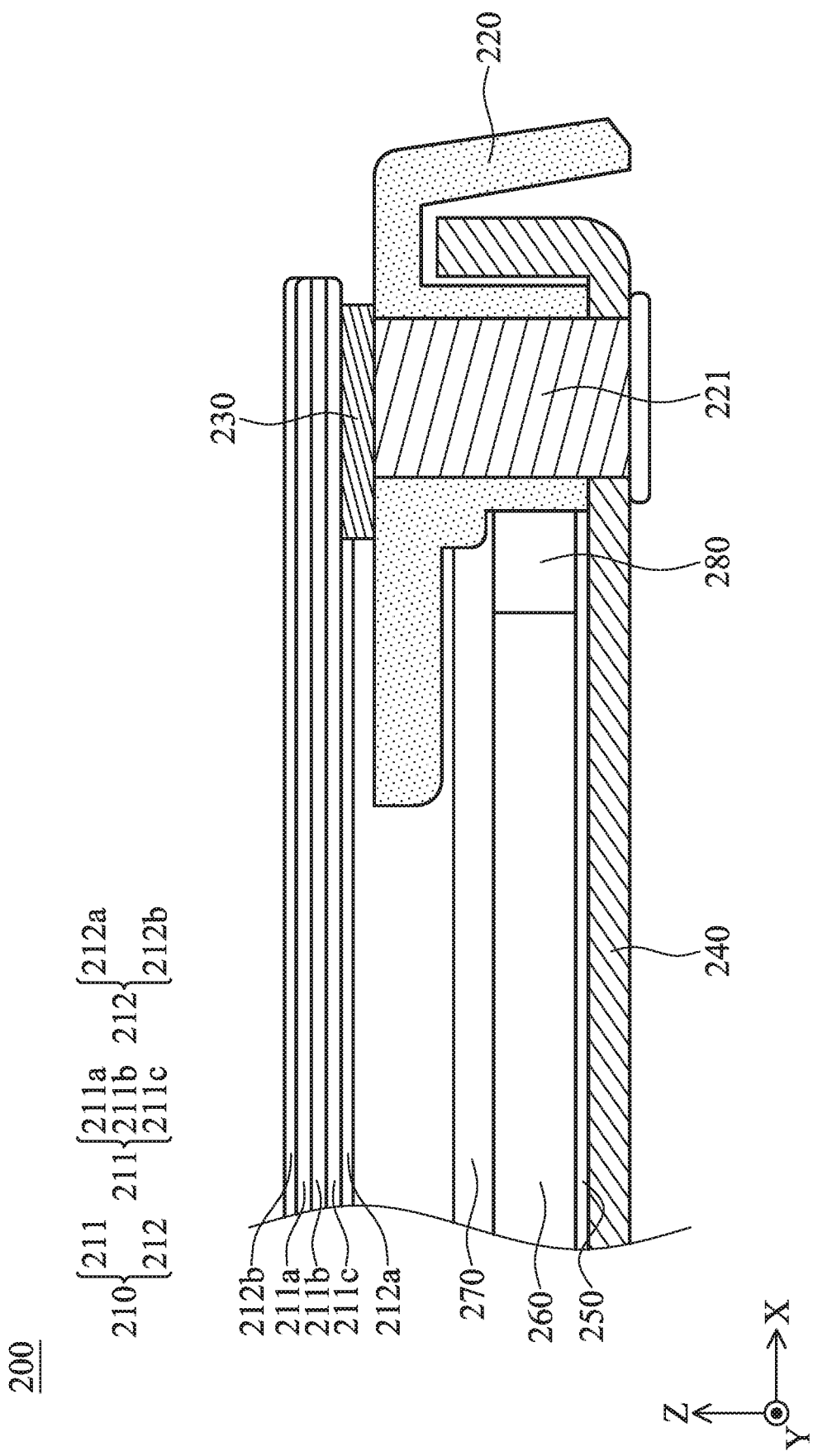
FIG. 8 is a cross-sectional view illustrating along the line B-B shown in FIG. 7.

FIG. 7 is a top view illustrating the display device 200 in accordance with some other embodiments of the present disclosure. FIG. 8 is a cross-sectional view illustrating along the line B-B shown in FIG. 7. It should be noted that the display device 200 in the present embodiment may include the same or similar parts as the display device 100 shown in FIGS. 1 and 2, and these same or similar parts will be denoted by similar reference numerals and will not be repeated again. For example, the display device 200 includes a panel 210, a frame 220, a fixing member 221, a conductive adhesive 230, a back plate 240, a reflective sheet 250, a light guide plate 260, an optical film 270, and a buffer element 280. In addition, the panel 210 includes a display structure layer 211 and a polarizing film 212 (including 212a and 212b), wherein the polarizing film 212a and the polarizing film 212b may be located on the upper and lower sides of the display structure layer 211. That is, the display structure layer 211 is located between the polarizing film 212 and the polarizing film 212b. The display structure layer 211 includes an upper substrate 211a, a liquid crystal layer 211b, and a lower substrate 211c that are sequentially stacked along the normal direction of the display device 200.

The difference between the display device 200 in the present embodiment and the display device 100 shown in FIGS. 1 and 2 is that the fixing member 221 of the display device 200 has the function of a conductive component, and no additional conductive component is provided. In the present embodiment, the fixing member 221 penetrates the back plate 240 and the frame 220 and is electrically connected to the conductive adhesive 230 and the back plate 240

(that is, contacts the conductive adhesive 230 and the back plate 240). When viewed in the Z axis direction (the normal direction), the fixing member 221 (the conductive component) and the conductive adhesive 230 at least partially overlap. In addition, as shown in FIG. 8, the conductive adhesive 230 is directly adhered to the display structure layer 211 of the panel 210 and contacts the polarizing film 212a. In other embodiments, the conductive adhesive 230 may contact at least one of the display structure layer 211 and the polarizing film 212a.

As set forth above, the embodiments of the present disclosure provide a display device with a conductive adhesive material adhered to a panel and a frame. In this way, the conductive adhesive may be electrically connected to the conductive component and the back plate, and then the external static electricity may be led out or grounded through the aforementioned conductive path. As such, the external static electricity does not affect the structure in the display panel, and/or improves the yield of the display device that passes the electrostatic discharge test, simplifying the assembly process or reducing the manufacturing cost. In addition, the conductive adhesive described in the embodiments of the present disclosure is integrally formed (that is, no additional adhesive layer is required to bond the conductive layer and the foam layer), and thereby the structural strength and durability of the conductive adhesive are significantly improved.

The display device in the above description serves as an example for illustration. However, if the electronic device is a self-luminous display device or other non-display device (such as an antenna device), the reflection sheet, the light guide plate, the optical film, etc. that belongs to components of a backlight module may be appropriately omitted.

While the embodiments and the advantages of the present disclosure have been described above, it should be understood that those skilled in the art may make various changes, substitutions, and alterations to the present disclosure without departing from the spirit and scope of the present disclosure. It should be noted that different embodiments in the present disclosure may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. A display device, comprising:
    a frame;
    a panel, comprising a polarizing film;
    a conductive adhesive, wherein the polarizing film is adhered to the frame via the conductive adhesive;
    a back plate affixed to the frame;
    a fixing member passing through the back plate to affix the back plate to the frame; and
    a conductive component, wherein the conductive adhesive is electrically connected to the back plate via the conductive component, and in a direction perpendicular to a top surface of the back plate, the fixing member and the conductive component are overlapped,
    wherein the polarizing film and the conductive adhesive are overlapped along the direction perpendicular to the top surface of the back plate, and
    wherein the conductive adhesive has a first width in a horizontal direction, a second width is formed from an edge of the panel to an edge of the frame in the horizontal direction, and the second width is greater than the first width.

2. The display device as claimed in claim 1, wherein the panel further comprises a display structure layer, the display structure layer is disposed on the frame, and the polarizing film is disposed on two opposite sides of the display structure layer.

3. The display device as claimed in claim 2, wherein the frame is adhered to the display structure layer or the polarizing film via the conductive adhesive.

4. The display device as claimed in claim 2, wherein the display device has a normal direction, and when viewed in the normal direction, the polarizing film and the conductive adhesive are not overlapped.

5. The display device as claimed in claim 2, wherein the display structure layer comprises an upper substrate, a liquid crystal layer, and a lower substrate, wherein the liquid crystal layer is disposed between the upper substrate and the lower substrate.

6. The display device as claimed in claim 1, wherein the display device has a normal direction, and when viewed in the normal direction, the conductive component and the conductive adhesive are at least partially overlapped.

7. The display device as claimed in claim 1, wherein the conductive component at least partially contacts the conductive adhesive.

8. The display device as claimed in claim 1, wherein the conductive adhesive comprises a first adhesive layer, a foam layer, a conductive layer, and a second adhesive layer sequentially stacked, and the conductive layer is closer to the frame than the foam layer.

9. The display device as claimed in claim 8, wherein the conductive layer and the foam layer are integrally formed.

10. The display device as claimed in claim 8, wherein the foam layer has a plurality of anchor pore walls fixedly connected to the conductive layer.

11. The display device as claimed in claim 10, wherein a maximum width of at least one of the plurality of anchor pore walls is in a range from 0.05 mm to 0.2 mm.

12. The display device as claimed in claim 1, further comprising:
    a light guide plate disposed on the back plate.

13. The display device as claimed in claim 12, further comprising a buffer element disposed between the frame and the light guide plate.

14. The display device as claimed in claim 12, further comprising:
    an optical film disposed on the light guide plate, wherein a buffer element disposed between the frame and the optical film.

15. The display device as claimed in claim 1, wherein the fixing member contacts with the conductive adhesive.

16. The display device as claimed in claim 15, wherein the display device has a normal direction, and when viewed in the normal direction, the fixing member and the conductive adhesive are at least partially overlapped.

* * * * *